United States Patent
Molotchko et al.

(10) Patent No.: US 7,730,029 B2
(45) Date of Patent: Jun. 1, 2010

(54) SYSTEM AND METHOD OF FAULT TOLERANT RECONCILIATION FOR CONTROL CARD REDUNDANCY

(75) Inventors: Andrew Molotchko, Kanata (CA); Dave Graham, Kanata (CA); Joseph Roy Cote, Carleton Place (CA)

(73) Assignee: Alcatel Lucent, Paris (FR)

( * ) Notice: Subject to any disclaimer, the term of this patent is extended or adjusted under 35 U.S.C. 154(b) by 272 days.

(21) Appl. No.: 11/521,347

(22) Filed: Sep. 15, 2006

(65) Prior Publication Data

US 2008/0082630 A1    Apr. 3, 2008

(51) Int. Cl.
*G06F 7/00*    (2006.01)
(52) U.S. Cl. .................. 707/613; 707/618; 714/20; 714/25; 714/48
(58) Field of Classification Search ............ 714/48
See application file for complete search history.

(56) References Cited

U.S. PATENT DOCUMENTS

| | | | |
|---|---|---|---|
| 4,980,857 A * | 12/1990 | Walter et al. .................. 714/45 |
| 6,601,076 B1 | 7/2003 | McCaw et al. | |
| 6,941,327 B2 | 9/2005 | Kim et al. | |
| 2002/0188711 A1 * | 12/2002 | Meyer et al. .................. 707/10 |
| 2003/0005107 A1 * | 1/2003 | Dulberg et al. .............. 709/223 |
| 2003/0112746 A1 * | 6/2003 | Schaller et al. ............. 370/216 |
| 2003/0135382 A1 * | 7/2003 | Marejka et al. ................. 705/1 |
| 2004/0133368 A1 * | 7/2004 | Johansson et al. ............. 702/58 |
| 2005/0050136 A1 * | 3/2005 | Golla ......................... 709/200 |
| 2007/0177184 A1 * | 8/2007 | Boston et al. ............... 708/530 |

* cited by examiner

*Primary Examiner*—Cam Y T Truong
(74) *Attorney, Agent, or Firm*—Kramer & Amado P.C.

(57) ABSTRACT

A system and method are provided for redundant control plane error handling allowing the inactive control plane to continue to act as a redundant failsafe when the inactive control plane database is in a compromised state which is below a certain predetermined level of maximum tolerable magnitude of error. Only if the inactive control plane database is in a state in which the errors associated therewith are intolerable, is a hard reset performed, or the reconciliation between the active and inactive control planes deemed to have failed.

8 Claims, 5 Drawing Sheets

SYSTEM AND METHOD OF FAULT TOLERANT RECONCILIATION FOR CONTROL CARD REDUNDANCY

FIELD OF THE INVENTION

The invention relates to control card redundancy and more particularly to control card database synchronization and management of control card redundancy in the event of synchronization error.

BACKGROUND OF THE INVENTION

In order to provide robust network services, network service providers often utilize redundant systems to ensure service to its customers. Redundant systems provide alternate equipment or components so that in the event of a failure in an active system which is currently providing services, there is an alternate inactive system ready to become active and take over to help ensure as minimal an interruption as possible and to avoid loss of data.

A standard component of network node equipment is a control plane or card which manages or controls the activities of the equipment and in particular a number of line cards which service the traffic flowing through the equipment. To provide redundancy protection, it is common practice to implement a second control plane to act as a backup in the event that the first control plane fails to operate. The control plane which is working and currently providing services is referred to as the active control plane while the redundant backup control plane is referred to as the inactive control plane. In order to ensure proper operation of the network equipment upon a redundant switchover, the state of the inactive control plane should be synchronized with that of the active control plane. Most importantly the active control plane database which houses important information regarding connections that are being carried by the network node including endpoint configuration information should be synchronized, in this case mirrored to, a redundant database of the inactive control plane. If the information in the inactive control plane database is not in synchronization when a redundant switchover occurs the connections or endpoint configurations could be dropped.

According to the current practice which is depicted in FIG. 1, network node equipment participating in communications with a network 10 is coupled by a protection switch 110 to the network 10 so that network traffic 30 can be diverted from active equipment to inactive equipment if a switchover is required. In FIG. 1, an active control plane 120 is logically aware 105 of a state of the protection switch 110. When the protection switch 110 is in active mode, network traffic 30 is directed toward active line cards (not shown) under the control of the active control plane 120. An inactive control plane 140 is also logically aware 115 of the state of the protection switch 110 so that if or when a protection switchover occurs it will become active.

The active control plane 120 includes an admin process 126 which administrates various functions on the active control plane 120 including an active control plane synchronization module 124 which is responsible for synchronizing an active control plane database 122 (DB1), which stores important data elements or attributes, with an inactive control plane database 142 (DB2) of the inactive control plane 140. Synchronization takes place in cooperation with an inactive control plane synchronization module 144 over a synchronization connection 130. The synchronization connection typically is established as an FTP connection upon a request from the admin process 126 of the active control plane 220 for reconciliation with the inactive control plane 140, although any type of connection which allows for the transport of data from the active control plane database 122 to the inactive control plane database 142 would suffice. The data elements or attributes are sent from the active control plane database 122 to the inactive control plane database 142 in the form of synchronization updates. Typically these synchronization updates comprise only state information which has changed in the active control plane database 122 and which needs updating in the inactive control plane database 142. The inactive control plane 140 also has an admin process 146 which administrates synchronization module 144. The admin process 146 checks the database synchronization updates for any errors before writing them to the inactive control plane database 142. The admin process 146 includes a process for initiating a hard reset on an error 148, which responds to any type of error raised during synchronization with a hard reset and full attempt at re-synchronization with the active control plane 120.

Having a hard reset on error directive responsive to an error during synchronization is a preferable resolution in the case that the error is inconsistent or caused by for example a transient hardware failure.

This solution however does not address the issue of a software error in an application being run on either control plane which may cause admin process 146 to detect an error has occurred in the synchronization of DB1 122 and DB2 142. In such a situation a hard reset would not constitute a remedy to the failure. In some cases where the error is consistent and cannot be resolved, the database synchronization process can fail or become trapped in a restart loop in which the inactive control plane 140 never becomes reconciled with the active control plane 120 rendering control redundancy ineffective and leaving the system susceptible to catastrophic failures leading to control complex outages and possible data service outages.

Existing solutions do not take into account that in some cases an error in synchronization is limited in scope or limited in impact within the node and upon the network in general while at the same time the absence of any type of control plane redundancy would in fact have enormous consequences should the active control plane fail. Currently, any error no matter how minor which indicates a synchronization failure is treated as an intolerable error which causes an automatic hard reset.

SUMMARY OF THE INVENTION

According to one broad aspect the invention provides for a method of redundant control plane synchronization in network node equipment, the method comprising: synchronizing a plurality of attributes between an inactive control plane database and an active control plane database; determining an error has occurred during synchronization; identifying the error; determining the inactive control plane database to be tolerable in the context of the error; allowing the synchronization to complete.

In some embodiments of the invention identifying the error comprises determining an error code associated with an occurrence of said error.

In some embodiments of the invention determining the inactive control plane database to be tolerable comprises determining a state of the inactive control plane database in the context of the error to be compromised less than a maximum tolerable magnitude of compromization.

In some embodiments of the invention determining the state of the inactive control plane database in the context of the error to be compromised less than the maximum tolerable magnitude of compromization comprises evaluating a logical qualifier with use of said error and said state of the inactive control plane database as inputs.

In some embodiments of the invention identifying the error comprises determining which particular attribute of said plurality of attributes caused said error.

In some embodiments of the invention determining the inactive control plane database to be tolerable comprises finding said particular attribute in a tolerable attribute error list.

In some embodiments of the invention said tolerable attribute error list is populated with entries corresponding to attributes of said plurality of attributes for which errors in said inactive control plane database would cause a limited impact on one of services provided by the network node equipment, and services provided by a network in which said network node equipment is situated, should a redundant switchover to the inactive control plane occur.

In some embodiments of the invention determining the inactive control plane database to be tolerable further comprises determining that a number of total attributes of said plurality of attributes which have been found in said tolerable attribute error list is less than a predetermined maximum number of tolerable attribute errors.

Some embodiments of the invention further provide for, after allowing the synchronization to complete, notifying an operator that the synchronizing of said plurality of attributes has completed, notifying said operator that the inactive control plane database is compromised, and notifying said operator of the error which occurred.

Some embodiments of the invention further provide for, after the step of determining that an error has occurred during synchronization: performing a hard reset; determining a synchronization mode to be high tolerance mode; re-initiating synchronization of said plurality of said attributes between said inactive control plane database and said active control plane database in said high tolerance mode; and determining an error has occurred during synchronization in high tolerance mode.

According to another broad aspect the invention provides for a system for redundant control plane synchronization in network node equipment, the system comprising: an inactive control plane comprising an inactive control plane database, and an inactive control plane synchronization module; an active control plane coupled to said inactive control plane by a synchronization connection, said active control plane comprising, an active control plane database, an active control plane synchronization module for synchronizing a plurality of attributes between said inactive control plane database and said active control plane database in cooperation with said inactive control plane synchronization module; and an admin process located on one of said inactive control plane and said active control plane, said admin process for determining an error has occurred during synchronization, for identifying the error, for determining the inactive control plane database to be tolerable in the context of the error, and for allowing the synchronization to complete.

In some embodiments of the invention said admin process identifies the error by determining an error code associated with an occurrence of said error.

In some embodiments of the invention said admin process determines the inactive control plane database to be tolerable by determining a state of the inactive control plane database in the context of the error to be compromised less than a maximum tolerable magnitude of compromization.

In some embodiments of the invention said admin process determines the state of the inactive control plane database in the context of the error to be compromised less than the maximum tolerable magnitude of compromization by evaluating a logical qualifier with use of said error and said state of the inactive control plane database as inputs.

In some embodiments of the invention said admin process identifies the error by determining which particular attribute of said plurality of attributes caused said error.

In some embodiments of the invention said admin process determines the inactive control plane database to be tolerable by finding said particular attribute in a tolerable attribute error list located on one of said active control plane and said inactive control plane.

In some embodiments of the invention said admin process determines the inactive control plane database to be tolerable by also determining that a number of total attributes of said plurality of attributes which have been found in said tolerable attribute error list is less than a predetermined maximum number of tolerable attribute errors.

In some embodiments of the invention said admin process is further for, after allowing the synchronization to complete: notifying an operator that the synchronizing of said plurality of attributes has completed; noting said operator that the inactive control plane database is compromised; and notifying said operator of the error which occurred.

In some embodiments of the invention said admin process is further for, after determining that an error has occurred during synchronization: performing a hard reset; determining a synchronization mode to be high tolerance mode; re-initiating synchronization of said plurality of said attributes between said inactive control plane database and said active control plane database in said high tolerance mode; and determining an error has occurred during synchronization in high tolerance mode.

BRIEF DESCRIPTION OF THE DRAWINGS

The features and advantages of the invention will become more apparent from the following detailed description of the preferred embodiments with reference to the attached figures, wherein.

It is noted that in the attached figures, like features bear similar labels.

DETAILED DESCRIPTION OF THE PREFERRED EMBODIMENTS

A system for synchronizing redundant control plane databases according to a preferred embodiment of the invention is now described with reference to FIG. 2 in terms of its structure.

Figure 1:
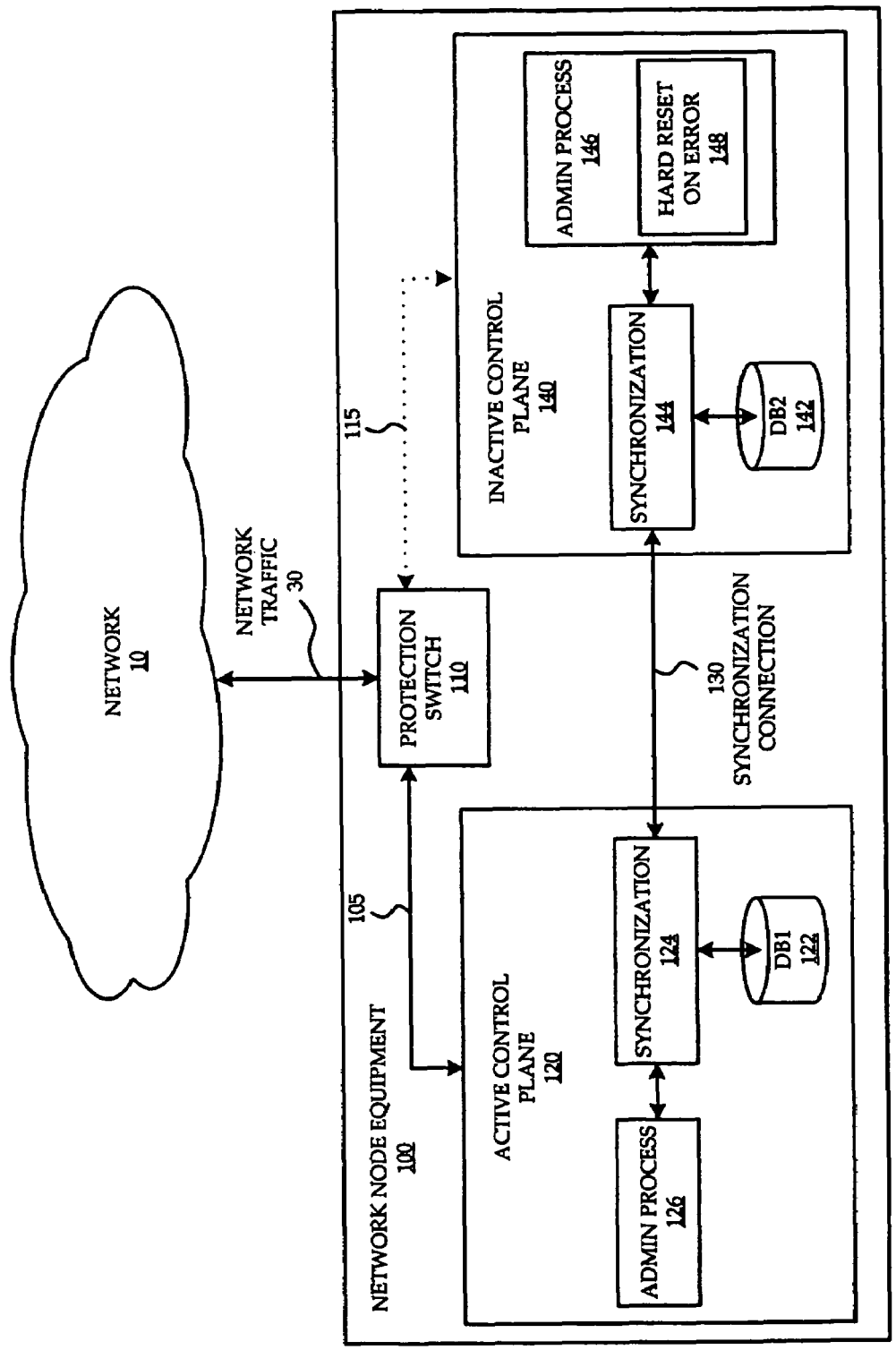
FIG. 1 is a schematic diagram illustrating known synchronization of redundant control plane databases.
Figure 2:
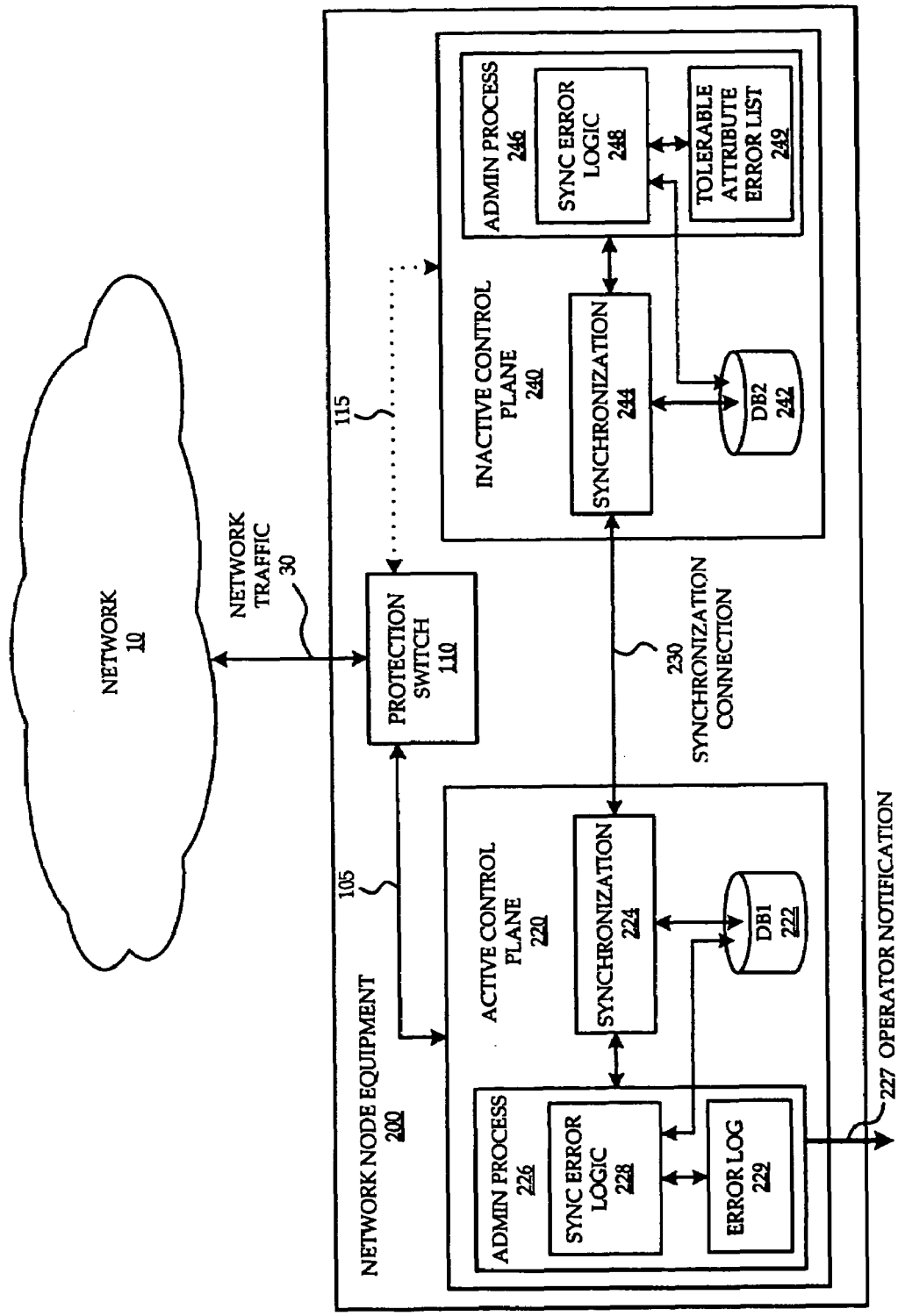
FIG. 2 is a schematic block diagram of a system for synchronizing redundant control plane databases according to the preferred embodiment of the invention.

In the system of FIG. 2, network node equipment 200 is coupled to a network 10 with which it is exchanging network traffic 30 which is controllably directed by a protection switch 110 to equipment and line cards controlled by an active control plane 220. As was described above in association with FIG. 1, a redundant inactive control plane 240 is standing by in case of a failure and the resulting redundant switchover. Both the active control plane 220 and the inactive control plane 240 are aware of the state of the protection switch 110 and whether or not a redundant switchover has been initiated. The active control plane 220 includes an administration process 226 which takes care of administration on the active control plane 220, and which comprises synchronization error logic 228, and an error log 229. The active control plane 220 also has facility for notifying 227 an operator of the state of the error log 229 and the errors within it. The admin process 226 is coupled to a synchronization module 224, which in turn is coupled to an active control plane database 222 (DB1). The synchronization error logic is also coupled to and has access to DB1 222. A synchronization module 244 of an inactive control plane 240 is coupled by a synchronization connection 230 to the synchronization module 224 of the active control plane 220. The synchronization module 244 of the inactive control plane 240 is coupled to an inactive control plane database 242 (DB2). The inactive control plane 240 also comprises an admin process 246 which performs administration of the inactive control plane 240 and which controls the synchronization module 244 of the inactive control plane 240. The admin process 246 of the inactive control plane 240 comprises a synchronization error logic module 248 which is coupled to and has access to DB2 242, and also is coupled to and has access to a tolerable attribute error list 249 stored in a memory store of inactive control plane 240.

The system of FIG. 2 will now be described in terms of function. While the active control plane 220 is in operation the inactive control plane is reconciled with the active control plane by synchronization of DB1 222 and DB2 242.

Upon initiation of a synchronization, the active control plane 220 and the inactive control plane 240 exchange information over synchronization connection 230. Typically this includes database updates from the synchronization module 224 of the active control plane 220 to the synchronization module 244 of the inactive control plane 240 so that DB2 242 is updated to mirror DB1 222. During synchronization the admin process 246 of the inactive control plane 240 checks the updates before they are written to the inactive control plane database DB2 242. In the preferred embodiment of FIG. 2, when an error in the updates or in the synchronization process is detected, synchronization error logic identifies 248 the error which also may include identifying an attribute of the databases which has caused the error.

In the preferred embodiment depicted in FIG. 2, while the synchronization process is in what is referred to hereinafter as "high tolerance" mode, the attribute or attributes which caused the error are compared to entries in the tolerable attribute error list 249. If any of the attributes are not in the tolerable attribute error list 249, the state of the inactive control plane database 242 is deemed to be intolerable for a redundant switchover, and the inactive control plane executes a hard restart. If all of the attributes are on the tolerable error attribute list 242, the state of the inactive control plane database 242 is deemed to be tolerable for a redundant switchover, a hard reset is not performed, and the process of synchronization continues. If synchronization completes with the state of DB2 242 deemed to be tolerable, the inactive control plane 240 will remain ready to take over in the event of a redundant switchover albeit in a compromised state.

In the preferred embodiment of the invention, the tolerable attribute error list 249 is populated or generated at installation but may be updated periodically with updates to the system, and comprises attributes or types of attributes which have been determined to have relatively limited impact upon the system if the redundant switch were to occur when those attributes are in error. It follows that attributes which would cause only a limited or localized effect on operation are good candidates for the tolerable attribute error list 249. Attributes which have a larger impact on the system, are perhaps system wide or effect a large number of connections and/or non-local operations are good candidates for attributes which are not to be included in the tolerable attribute error list 249. Other kinds of attributes with larger impact include interdependent attributes which affect each other or attributes which could cause crashes or system wide failure if incorrect.

Attributes which are examples of good candidates for the tolerable attribute error list 249 include but are not limited to those dealing with endpoint OAM configuration, soft permanent virtual circuits (SPVC) configuration, and connect attribute for point to point connections.

Attributes which are examples of good candidates for not including in the tolerable attribute error list 249 include but are not limited to those attributes dealing with control nodes such as a control node's location or IP address or its physical node ID.

If synchronization has completed in which the inactive control plane database 242 is in a compromised state, an operator is notified by operator notifications 227 of the errors and failed attributes to facilitate correction of the errors. While the operator attempts to correct the errors, he or she can be assured that some level of redundancy protection is still being provided for the services being carried out by the active control plane 220.

In general the admin process 246 of the inactive control plane 240 may comprise an advanced synchronization error logic which can perform an analysis of DB2 242 in the context of an error in synchronization to determine if as a result of the synchronization error, the state of DB2 242 would be intolerable. This advanced synchronization logic could cooperate with the admin processes 226, 246 of both control planes 220, 240, to assess if the state of the databases 222, 242 is tolerable in the current operational context. Instead of a tolerable attribute error list a set of logical qualifiers could be used. In some embodiments, errors would have weights or magnitudes associated therewith to quantify the magnitude of the total errors in DB2 for comparison with a maximum tolerable magnitude of error. These qualifiers could define values of attributes which render the errors tolerable and other values of attributes which would render the errors intolerable. These qualifiers could specify that certain attributes are tolerable if they fail on their own but not tolerable if they fail in conjunction with other certain attribute failures. One example logical qualifier could compare the number of failed attributes with the total number of attributes currently stored in DB2 242 to determine whether the state of DB2 242 is intolerable. Instead of attributes being associated directly with the synchronization error logic, error codes could be used for higher level errors during synchronization. Logical qualifiers could specify that the error is tolerable or intolerable if it occurs in association with a specific slot or service or interface. Specific lists of tolerable (or intolerable) error codes could be stored instead of or in addition to the tolerable attribute error list, providing more varied and robust definitions of when DB2 242 is and when it is not in a tolerable state in the context of the particular error during synchronization. Many other possible logical qualifiers could be utilized in determining a state of the inactive control plane database in the context of the error.

The steps for synchronizing redundant control plane databases according to a broad exemplary embodiment of the invention is now described with reference to FIG. 3.

Synchronization according to the broad exemplary embodiment occurs on an attribute by attribute basis. At step 300 it is determined whether or not the synchronization is complete. If it is complete the process ends, if not the next attribute is synchronized in step 310. At step 320 it is determined whether or not there is an error in synchronization. If there is no error in synchronization the process proceeds back to the start. If there is an error in the synchronization as checked at step 320, the process proceeds to step 330 where a synchronization mode is checked. If the synchronization mode is currently set to "normal" then any error causes the process to proceed to step 380 for a hard reset. If the synchronization mode is not set to normal which in the preferred embodiment would be set to "high tolerance", then the process proceeds to step 340 in which the error is identified. At step 350 the error is sent to an error log. Referring to FIG. 2, an error log 229 may reside in the active control plane 220 and be coupled to and accessible by the active control plane synchronization error logic 228. After the error has been sent to the error log in step 350, an analysis is performed of the state of the inactive control plane database DB2 242 in the context of the error at step 360. At step 370 it is determined whether or not the state of DB2 242 is tolerable. If the state of DB2 242 is determined to be tolerable, the process continues back to the start If the state of DB2 242 is determined to be intolerable, the reconciliation process has failed and the process proceeds to step 380 for a hard reset.

The state of DB2 242 may be determined to be intolerable if some measure of a magnitude of error in DB2 242 or similarly a magnitude of impact on the system those errors may cause, exceeds a certain maximum tolerable magnitude of error or respectively impact on the system. Generally a measure of intolerability is linked with a level of compromization of the state of DB2 242. The method steps illustrated in FIG. 4 provide an example test for when the state of DB2 242 is intolerable in the context of a tolerable attribute error list 249.

The steps for analyzing the state of the inactive control plane database in the context of a synchronization error according to a preferred embodiment of the invention are now described with reference to FIG. 4: In this embodiment, analysis is performed by a relatively simple synchronization error logic 248, and is a particular set of steps which may be carried out as part of step 360 of FIG. 3, namely the step of analyzing the state of DB2 242 in the context of the synchronization error.

Figure 4:
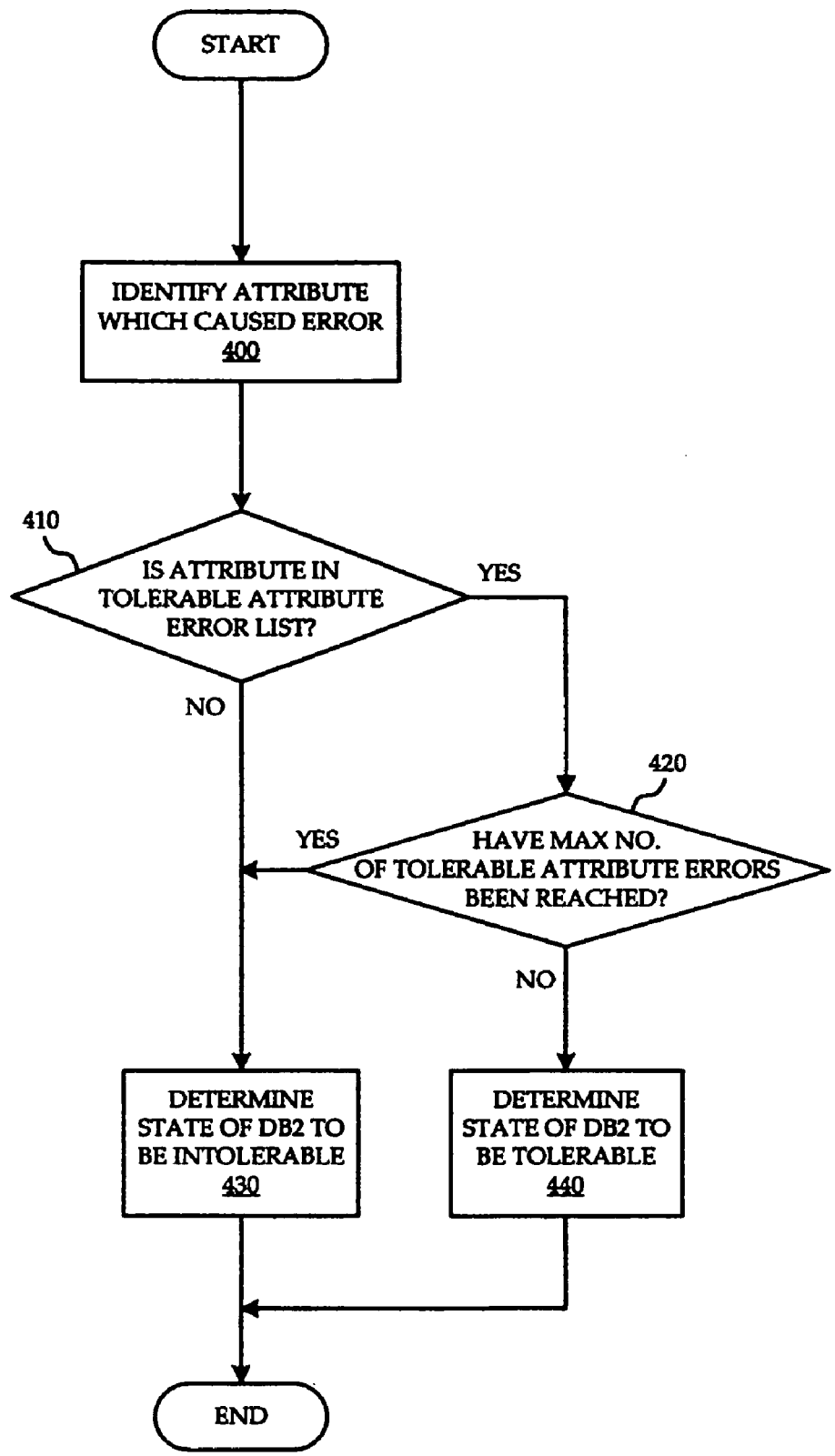
FIG. 4 is functional block diagram illustrating steps for analyzing the state of the inactive control plane database in the context of a synchronization error according to a preferred embodiment of the invention.

At step 400 of FIG. 4, an attribute which caused the error is identified. The attribute is then in step 410 checked against the tolerable attribute error list 249. If the attribute is not found in the list, at step 430 the state of DB2 242 is found to be intolerable and the process ends. If the attribute is found in the tolerable attribute error list 249, then at step 420 it is determined whether or not the maximum number of tolerable attribute errors has been reached. In a preferred embodiment the maximum number of tolerable attribute errors is 30. If the maximum number of tolerable attribute errors has been reached, then in step 430 the state of DB2 242 is found to be intolerable and the process ends. If the maximum number of tolerable attribute errors has not been reached, then the state of DB2 242 is determined to be tolerable at step 440 and the process ends.

Figure 3:
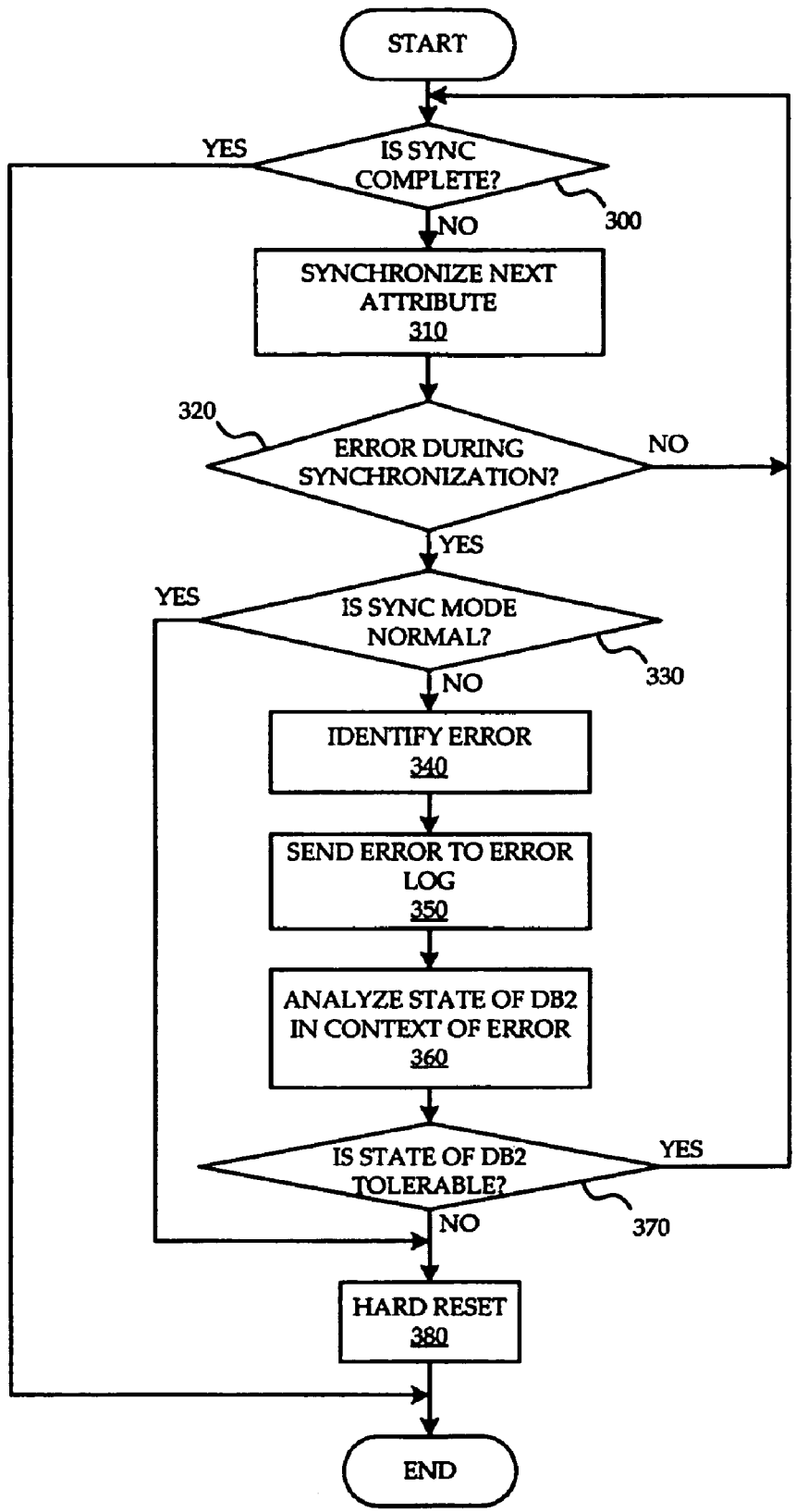
FIG. 3 is a functional block diagram illustrating steps for synchronizing redundant control plane databases according to a broad exemplary embodiment of the invention.

The general result of these steps is that if any error is not in the tolerable attribute error list 249 or if the number of tolerable attribute errors exceeds a predetermined maximum, the state of the inactive control plane database DB2 242 is deemed to be intolerable, the consequence of which being a hard reset due to a reconciliation failure as discussed in association with FIG. 3.

As discussed above, other possible analyses of the state of DB2 242 in the context of the error may be performed which could involve much more advanced logic and utilize more processing and memory resources.

Figure 5:
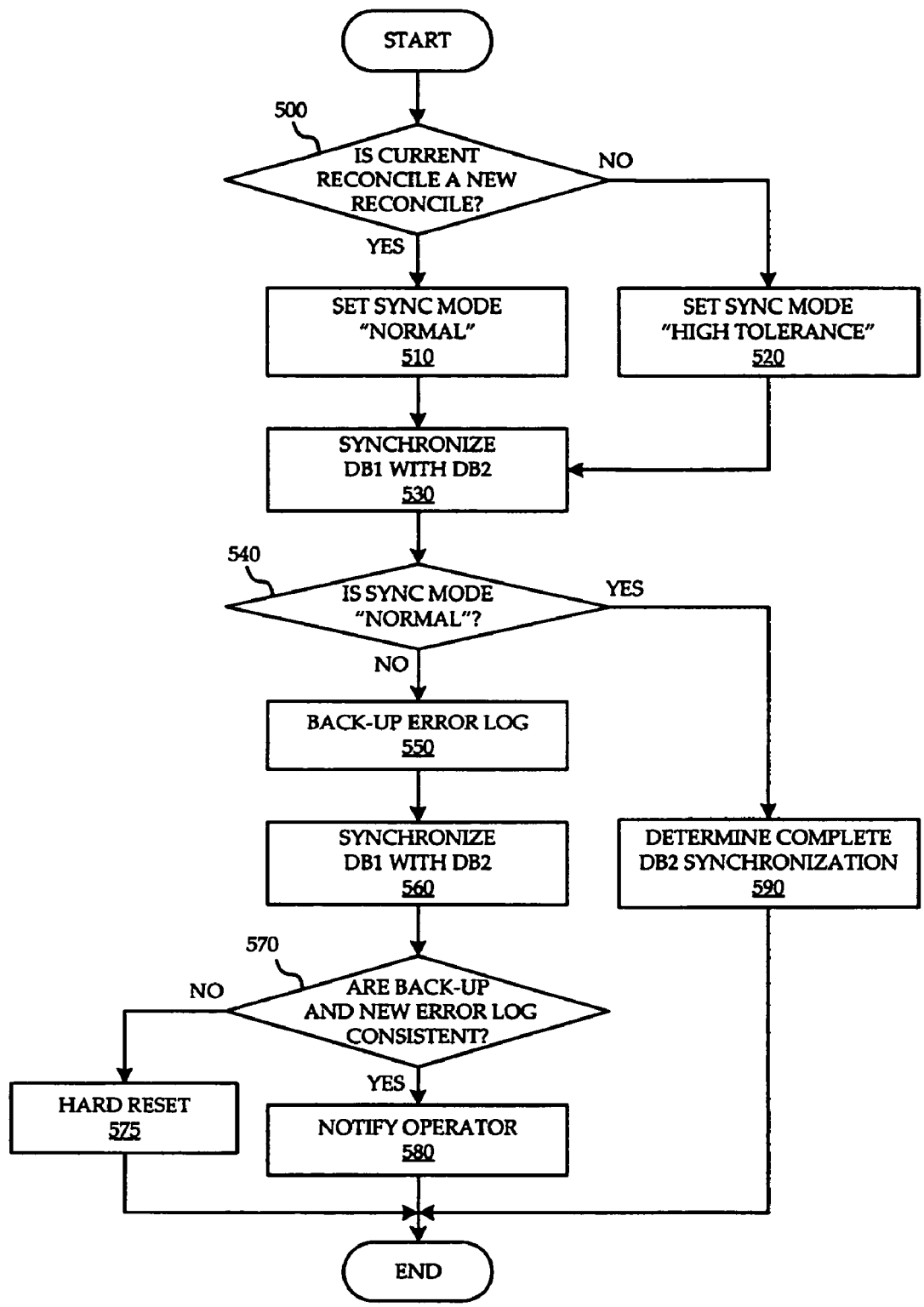
FIG. 5 is a functional block diagram illustrating high level management of reconciliation of redundant control cards according to a preferred embodiment of the invention.

Referring to FIG. 5, high level management of reconciliation of redundant control cards according to a preferred embodiment of the invention will now be discussed.

In the normal course of reconciliation between the active and inactive control planes, synchronization will occur at various times. A complete synchronization at start up is typically performed, while update synchronizations are performed as attributes stored in the active control plane database 242 change as a result of changing network conditions and states of connections being serviced by the node equipment 200. Upon a request for reconciliation from the active control plane admin process 226, at step 500 it is first determined whether or not commencement of the current reconcile is the result of a previously failed reconcile or is the start of a new reconcile. A new reconcile would be the first reconcile or a reconcile following a successfully completed reconcile. If it is from a previously failed reconcile it is deemed to be as a result of an error encountered in a previous first reconciliation attempt in "normal" mode and hence in step 520 the synchronization mode is set to "high tolerance". If the current reconcile is a new reconcile the process proceeds to step 510 where the synchronization mode is set to "normal". After the synchronization mode has been set in either step 510 or 520, DB2 242 and DB1 222 are synchronized with each other at step 530. Once synchronization is complete the process determines at step 540 if the synchronization mode is "normal" and if it is, the process determines that DB2 242 has undergone a single complete and successful synchronization at step 590 and the process ends. If the synchronization mode is not "normal", in which case the mode is "high tolerance", the process prepares to go through a second synchronization to ensure consistent error behavior. At step 550 a back-up is made of the error log. After the back up is made, DB2 222 and DB1 242 are synchronized with each other at step 560, a consequence of which is that a new error log is created with entries logging the synchronization errors as discussed in association with FIG. 3. At step 570, it is determined whether or not the back-up error log and the new error log are consistent. If the error logs are inconsistent, the inactive control plane 240 is subjected to a hard reset in step 575. If the error logs are consistent, the inactive control plane 240 is allowed to operate with its compromised database DB2 242 and the operator is notified at step 580 that synchronization has completed but that DB2 242 is in a compromised state, and that certain attributes have failed, before the process ends.

By allowing the inactive control plane to continue to operate while its database DB2 242 is in a compromised state, many errors which would have caused a hard reset loop according to the previous practice are accepted as tolerable errors and hence many instances in which a hard reset loop would have occurred are avoided.

It should be understood that although the tolerable attribute error list 249 has been depicted as being located in the admin process 246 of the inactive control plane 240, and the synchronization error logic module 248 of the inactive control plane 240 has been described as being the module which analyses the tolerability of DB2 242 in the context of errors, these functions could equally be found in the admin process 226 of the active control plane 220, as long as the error messages and the state of DB2 242 are accessible to them. In general as long as the functions described above regarding processing of errors in the synchronization process are performed, the advantages of the present invention will be present, independent of how specifically theses functions are shared between the active and inactive control planes.

In an alternative embodiment, the tolerable attribute error list is located on the active control plane 220, and all high level synchronization error processing is handled by the active control plane 220. In this embodiment, the inactive control plane 240 reports all errors to the active control plane 220, while the active control plane 220 is responsible for assessing whether or not the inactive control plane database DB2 242 is tolerable or not in the context of the errors, and in the case where DB2 242 is not tolerable, the active control plane 220 instructs the inactive control plane 240 to perform a hard reset.

The embodiments presented are exemplary only and persons skilled in the art would appreciate that variations to the embodiments described above may be made without departing from the spirit of the invention. The scope of the invention is solely defined by the appended claims.

We claim:

1. A method of redundant control plane synchronization in network node equipment having an active control plane and an inactive control plane, wherein the active control plane comprises an active control plane synchronization error logic module coupled to an error log and an active control plane database, and wherein the inactive control plane comprises an inactive control plane synchronization error logic module coupled to a tolerable attribute error list and an inactive control plane database, the method comprising:

synchronizing a plurality of attributes between the inactive control plane database and the active control plane database by updating the inactive control plane database to mirror the active control plane database;

detecting at least one error in the synchronization of said inactive control plane database and said active control plane database and sending the at least one error to the error log;

using the inactive control plane synchronization error logic module to identify said at least one error and identify which of said attributes of said inactive;

control plane database and said active control plane database caused said at least one error;

using the inactive control plane synchronization error logic module to compare attributes that caused said at least one error to entries in the tolerable attribute error list;

when any of said attributes that caused said at least one error are not in said tolerable attribute error list, determining the inactive control plane database to be intolerable for a redundant switchover, and executing a hard restart with said inactive control plane database;

when all of said attributes that caused said at least one error are in said tolerable attribute error list, determining the inactive control plane database to be tolerable for said redundant switchover unless a maximum number of tolerable attribute errors has been reached; and performing a second synchronization, the second synchronization comprising:

using the active control plane synchronization error logic module to make a back-up error log of the error log, synchronizing the active and inactive control plane databases to create a new error log, and comparing the back-up and new error logs, so that when the comparison is inconsistent, a hard reset occurs on the inactive control plane, and when the comparison is consistent, the inactive control plane continues to operate and an operator is notified that the inactive control plane database is in a compromised state;

determining an error code associated with an occurrence of said at least one error; and determining a state of the inactive control plane database in the context of the at least one error to be compromised less than a maximum tolerable magnitude of compromization.

2. The method of claim 1, further comprising:
evaluating a logical qualifier with use of said at least one error and said state of the inactive control plane database as inputs.

3. The method of claim 1, further comprising:
populating said tolerable attribute error list with entries corresponding to:
attributes of said plurality of attributes for which errors in said inactive control plane database would cause a limited impact on services provided by the network node equipment, and
services provided by a network in which said network node equipment is situated, should a redundant switchover to the inactive control plane occur.

4. The method of claim 3, further comprising:
determining that a number of total attributes of said plurality of attributes which have been found in said tolerable attribute error list is less than a predetermined maximum number of attribute errors.

5. A system for redundant control plane synchronization in network node equipment, the system comprising:
a memory;
an inactive control plane comprising: an inactive control plane database, an inactive control plane synchronization error logic module coupled to a tolerable error attribute list, and an inactive control plane synchronization module;
an active control plane coupled to said inactive control plane by a synchronization connection, said active control plane comprising:
an active control plane database, an active control plane synchronization error logic module coupled to an error log, an active control plane synchronization module that synchronizes a plurality of attributes between said inactive control plane database and said active control plane database in cooperation with said inactive control plane synchronization module by updating the inactive control plane database to mirror the active control plane database, wherein the inactive control plane synchronization error logic module identifies at least one error and at least one of the plurality of attributes which has caused the at least one error,
compares attributes that caused said at least one error to entries in the tolerable attribute error list,
when any of said attributes that caused said at least one error are not in said tolerable attribute error list, determines the inactive control plane database to be intolerable for a redundant switchover and executes a hard restart with said inactive control plane database,
when all of said attributes that caused said at least one error are on said tolerable attribute error list, determines the inactive control plane database to be tolerable for said redundant switchover unless a maximum number of tolerable attribute errors has been reached, and wherein the active control plane synchronization error logic module makes a back-up error log of the error log and, after the active and inactive control plane database are synchronized to create a new error log, compares the back-up and new error logs, so that when the comparison is inconsistent, a hard reset occurs on the inactive control plane, when the comparison is consistent, the inactive control plane continues to operate and an operator is notified that the inactive control plane database is in a compromised state, wherein said inactive control plane synchronization error logic module identifies the at least one error by determining an error code associated with an occurrence of said at least one error, wherein said inactive control plane synchronization error logic module determines the inactive control plane database to be tolerable by determining a state of the inactive control plane database in the context of the at least one error to be compromised less than a maximum tolerable magnitude of compromization.

6. The system of claim 5, wherein said inactive control plane synchronization error logic module determines the state of the inactive control plane database in the context of the at least one error to be compromised less than the maximum tolerable magnitude of compromization by evaluating a logical qualifier with use of said at least one error and said state of the inactive control plane database as inputs.

7. The system of claim 5, wherein said tolerable attribute error list is populated with entries corresponding to attributes of said plurality of attributes for which errors in said inactive control plane database would cause a limited impact on services provided by the network node equipment, and services provided by a network in which said network node equipment is situated, should a redundant switchover to the inactive control plane occur.

8. The system of claim 7, wherein said inactive control plane synchronization error logic module determines the inactive control plane database to be tolerable by also determining that a number of total attributes of said plurality of attributes which have been found in said tolerable attribute error list is less than a predetermined maximum number of tolerable attribute errors.

\* \* \* \* \*